United States Patent

Kubo et al.

[11] Patent Number: 5,760,143
[45] Date of Patent: Jun. 2, 1998

[54] ESTER-AMIDE BLOCK COPOLYMER AND PROCESS FOR PRODUCING SAME

[75] Inventors: Yuji Kubo; Hiroshi Yamakawa; Isamu Kirikihira, all of Yokkaichi; Shinji Shimosato, Ama-gun, all of Japan

[73] Assignee: Tosoh Corporation, Yamaguchi, Japan

[21] Appl. No.: 558,773

[22] Filed: Nov. 15, 1995

[30] Foreign Application Priority Data

Nov. 16, 1994 [JP] Japan ................................ 6-281843

[51] Int. Cl.[6] .................................................. C08F 283/04
[52] U.S. Cl. ...................... 525/425; 525/432; 525/437; 528/288; 528/318
[58] Field of Search ...................... 528/288, 318; 525/432, 437, 425

[56] References Cited

U.S. PATENT DOCUMENTS 4,810,770  3/1989  Greene et al. ...................... 528/289

FOREIGN PATENT DOCUMENTS

| | | |
|---|---|---|
| 0267773 | 5/1988 | European Pat. Off. . |
| 0377447 | 7/1990 | European Pat. Off. . |
| 0608976 | 8/1994 | European Pat. Off. . |
| 44-30751 | 12/1969 | Japan . |
| 8908125 | 9/1989 | WIPO . |

*Primary Examiner*—Terressa Mosley
*Attorney, Agent, or Firm*—Sughrue, Mion, Zinn, Macpeak & Seas

[57] ABSTRACT

An ester-amide block copolymer of the formula (1):

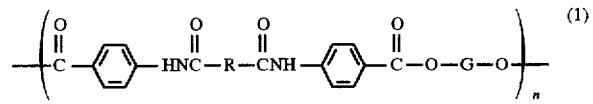

wherein R is an aromatic hydrocarbon group with 6-20 carbon atoms and G is a residue of an aliphatic polyester, an aliphatic polycarbonate, an aliphatic polyethercarbonate or a polyorganosiloxane, and having a weight average molecular weight of 30,000–1,000,000. This copolymer is advantageously prepared by polycondensing an activated acyl lactam-terminated aromatic amide of the formula (2) with a diol of the formula (3) by bulk polymerization in a molten state:

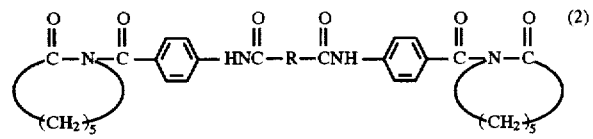

wherein R and G are the same as defined above.

10 Claims, 5 Drawing Sheets

ESTER-AMIDE BLOCK COPOLYMER AND PROCESS FOR PRODUCING SAME

BACKGROUND OF THE INVENTION (1) Field of the Invention

This invention relates to an ester-amide block copolymer, and a process for producing the ester-amide block copolymer.

The ester-amide block copolymer of the present invention is a thermoplastic elastomer which has good thermal resistance, thermal aging resistance, mechanical strength and oil resistance, and is useful, for example, for automotive parts, industrial parts, electrical and electronic parts, and coverings and coatings for these parts.

(2) Description of the Related Art

Conventional thermoplastic polyamide elastomers have good oil resistance and mechanical strength, and are used, for example, for automotive parts, electrical and electronic parts and machine parts. The hard segments of the conventional polyamide elastomers are generally aliphatic polyamide units such as nylon 6 units and nylon 66 units. However, thermoplastic polyamide elastomers composed of an aliphatic polyamide unit such as a nylon 6 unit or a nylon 66 unit as a hard segment and a polytetramethylene glycol unit or a polycaprolactone unit as a soft segment have a poor thermal resistance.

Proposals have been made wherein a diester of diamidedicarboxylic acid (Japanese Examined Patent Publication No. 44-30751) or a dibutyl diamidedicarboxylate (Japanese Unexamined Patent Publication No. 63-159432) is used as the hard segment of a thermoplastic polyamide elastomer for enhancing its thermal resistance. The proposed thermoplastic polyamide elastomer is prepared by polycondensation of the hard segment with a soft segment which is conducted in the presence of a polycondensation catalyst to perform as an ester exchange reaction accompanied by elimination of butyl alcohol. The rate of diffusion of butyl alcohol is low and the reactivity of the hard segment with the soft segment is poor. Thus, the thermoplastic polyamide elastomer does not possess a molecular weight high enough to secure good mechanical strength.

Especially where the soft segment is a polyester unit or a polycarbonate unit, the soft segment tends to be degraded when the segment is copolycondensed with a hard segment in the presence of a polycondensation catalyst, i.e., an ester exchange catalyst. Therefore the resulting elastomer does not have a molecular weight high enough to secure good mechanical strength.

Where the soft segment is a polyether unit such as a poly(alkyleneoxy) glycol unit, oxidative degradation tends to occur and the resulting elastomer has a poor thermal aging resistance.

SUMMARY OF THE INVENTION

In view of the foregoing, a primary object of the present invention is to provide a high-molecular-weight ester-amide block copolymer exhibiting good resistance to thermal aging and oxidative degradation and having high mechanical strength.

In one aspect of the present invention, there is provided an ester-amide block copolymer represented by the following formula (1):

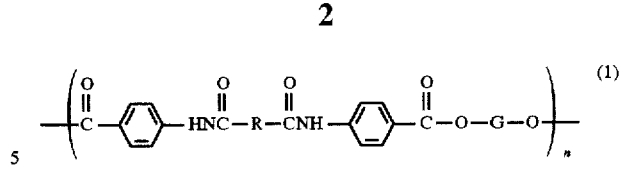

wherein R is a divalent aromatic hydrocarbon group having 6 to 20 carbon atoms and G is an aliphatic polyester residue, an aliphatic polycarbonate residue, an aliphatic polyethercarbonate residue or a polyorganosiloxane residue, and n is a number corresponding to the weight average molecular weight of the copolymer which is in the range of 30,000 to 1,000,000 as measured by gel permeation chromatography (GPC) and expressed in terms of polystyrene.

In another aspect of the present invention, there is provided a process for producing the ester-amide block copolymer represented by the formula (1), which comprises polycondensing an activated acyl lactam-terminated aromatic amide compound represented by the following formula (2) with a diol compound represented by the following formula (3) by a bulk polymerization procedure in a molten state, the ratio of the activated acyl lactam-terminated aromatic amide compound to the diol compound being in the range of 0.8/1.0 to 1.0/0.8 by mole:

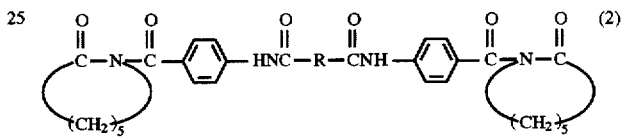

wherein R in formula (2) and G in formula (3) are the same as defined with regard to formula (1).

DESCRIPTION OF THE PREFERRED EMBODIMENTS

Figure 1:
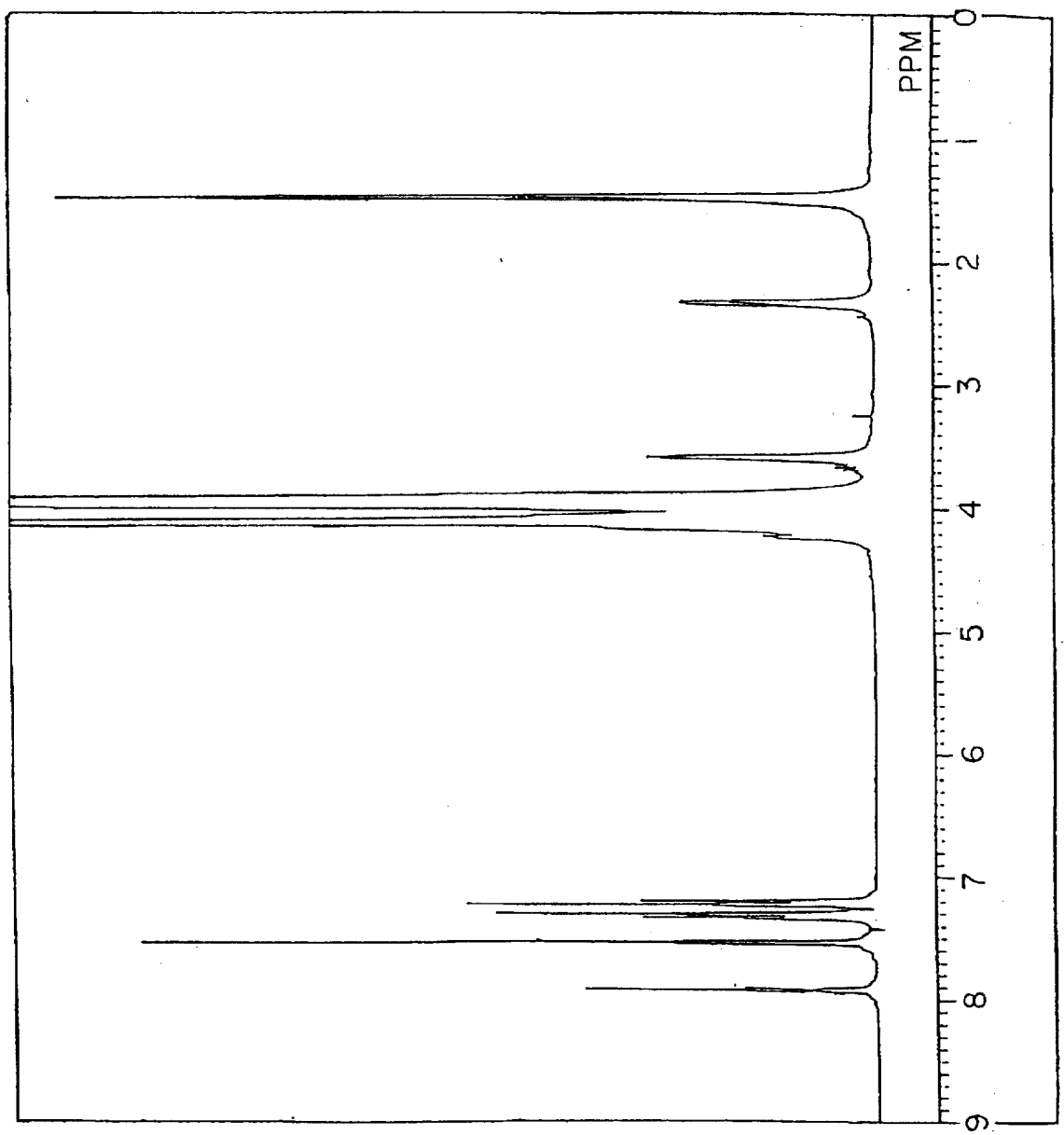
FIG. 1 is the $^1$H-NMR spectrum of an activated acyl lactam-terminated aromatic amide prepared in Synthesis Example 3.

In formula (1) representing the esteramide block copolymer of the present invention, R is not particularly limited provided that R is an aromatic hydrocarbon group having 6 to 20 carbon atoms. As examples of R, there can be mentioned a phenylene group, a tolylene group, a xylylene group, a naphthylene group and a biphenylene group. Of these, a phenylene group is preferable. An esteramide block copolymer of formula (1) wherein R is a phenylene group has high a melting point and softening point, and exhibits a more enhanced thermal resistance.

G is not particularly limited provided that it is selected from an aliphatic polyester residue, an aliphatic polycarbonate residue, an aliphatic polyethercarbonate residue and a polyorganosiloxane residue. As examples of G, there can be mentioned polyesters such as poly(caprolactone), poly(methylvalerolactone), poly(ethylene adipate), poly (butylene-1,4 adipate), poly(methylpentanediol adipate) and poly(butylene-1,4 hexanediol-1,6 adipate); polycarbonates such as poly(hexanediol-1,6 carbonate); polyethercarbonates such as polytetrahydrofurancarbonate; and polyorganosiloxanes such as poly(dimethylsiloxane) and poly (methylphenylsiloxane).

The molecular weight of the esteramide block copolymer is in the range of 30,000 to 1,000,000, preferably of 80,000 to 500,000, more preferably of 100,000 to 200,000, as weight average molecular weight as measured gel permeation chromatography (GPC) and expressed in terms of polystyrene. An esteramide block copolymer with a weight average molecular weight of this range exhibits high mechanical strength and enhanced melt-flowability and moldability.

The esteramide block copolymer of the present invention is prepared by processes similar to those which are employed for the production of conventional block copolymer-type thermoplastic elastomers. As examples of the preparation processes, there can be mentioned a process wherein a diamidedicarboxylic acid diester is polycondensed with a diol compound in the presence of an ester exchange catalyst by a bulk melt-polycondensation procedure, a process wherein diamidedicarboxylic acid dichloride is polycondensed with a diol compound in a solution medium, and a process wherein an aminobenzoic acid-terminated diol compound is polycondensed with an aromatic dicarboxylic acid dichloride in a solution medium.

The ester-amide block copolymer of the present invention is advantageously produced by a process which comprises polycondensing an activated acyl lactam-terminated aromatic amide compound represented by the above formula (2) with a diol compound represented by the above formula (3) by a bulk polymerization procedure in a molten state.

The diol compound of formula (3) used for the preparation of the ester-amide block copolymer is not particularly limited provided that it is a polymer having hydroxyl groups at both terminals. As examples of the diol compound, there can be mentioned polyesterpolyols such as poly (caprolactone)diol (PCL), poly(methylvalerolactone)diol, poly(ethylene adipate) glycol, poly(butylene-1,4 adipate) glycol (PBA), poly(methylpentanediol adipate) glycol and poly(butylene-1,4 hexanediol-1,6 adipate) glycol; polycarbonate diols such as poly(hexanediol-1,6 carbonate) diol and polytetrahydrofurancarbonate diol (PCD); and poly (organosiloxane) diols such as poly(dimethylsiloxane) glycol (PDMS) and poly(methylphenylsiloxane) glycol. Usually, diol compounds having a molecular weight of 250 to 8,000 are used. Especially diol compounds having a molecular weight of 250 to 4,000 are preferable because esteramide block copolymers having excellent low-temperature characteristics are obtained.

As examples of the activated acyl lactam-terminated aromatic amide compound of formula (2) used for the preparation of the ester-amide block copolymer, there can be mentioned 4,4'-(phenylenediamide)dibenzoyl-dicaprolactam, 4,4'-(tolylenediamide)dibenzoyl-dicaprolactam, 4,4'-(xylylenediamide)dibenzoyl-dicaprolactam, 4,4'-(naphthylenediamide)dibenzoyl-dicaprolactam and 4,4'-(biphenylenediamide)dibenzoyl-dicaprolactam.

The polycondensation of the activated acyl lactam-terminated aromatic amide compound with the diol compound is preferably carried out in the absence of a catalyst by a bulk melt-polycondensation procedure. This process is not complex nor costly, and a high-molecular-weight ester-amide block copolymer can easily be prepared because an ester exchange catalyst is not used.

Where the activated acyl lactam-terminated aromatic amide compound is polycondensed with the diol compound, it is preferable that the reactants are subjected to bulk melt-polycondensation at normal pressure to prepare a prepolymer having a molecular weight not higher than 10,000 and then the prepolymer is polymerized under a reduced pressure while ε-caprolactam is removed, or that the reactants are subjected to polycondensation in the presence of a solvent preferably having a boiling point of 140° to 290° C. to prepare a prepolymer having a molecular weight not higher than 10,000, and then the solvent is removed and the prepolymer is subjected to bulk melt-polymerization.

When polycondensation is conducted in the presence of a solvent, the rate of polycondensation is high and a prepolymer having a narrow molecular-weight distribution can be prepared within a short period of time. More specifically a solvent, the activated acyl lactam-terminated aromatic amide compound and the diol compound are charged in a reactor and uniformly stirred in the initial stage of polycondensation, and the temperature is elevated to a pre-determined reaction temperature at which the reactants are polycondensed at normal pressure for a predetermined period of time to prepare a prepolymer. The reaction temperature and the reaction time vary depending upon the particular kind of diol compound, but the temperature is usually in the range of 140° to 220° C., preferably 190° to 210° C. At a reaction temperature within this range, the polycondensation of the activated acyl lactam-terminated aromatic amide compound with the diol compound proceeds at a high rate without degradation of the diol compound, and therefore, a polymer of a high molecular weight is produced. The reaction time is usually 2 to 6 hours.

After the preparation of a prepolymer, the solvent is gradually distilled off under a reduced pressure over a period of 30 to 60 minutes whereby the prepolymer is transferred to a bulk-molten state. Then the molten pre-polymer is polymerized while ε-caprolactam is distilled off at a temperature of 210° to 270° C. and a reduced pressure of 0.1 to 2 mmHg for a period of 2 to 6 hours to afford a high-molecular-weight esteramide block copolymer. To minimize the thermal degradation of polymer, preferably the reaction temperature is 220° to 250° C. and the reaction time is 3 to 4 hours.

The ratio of the amount of the activated acyl lactam-terminated aromatic amide compound to the amount of the diol compound is usually in the range of 0.8/1.0 to 1.0/0.8 by mole and preferably 0.995/1.0 to 1.0/0.995 by mole to afford a polymer having a high molecular weight. The ratio of the amounts of the reactants charged greatly influences the degree of polymerization, and, when the ratio is equimolar, the degree of polymerization becomes highest.

The solvent used for the reaction of the activated acyl lactam-terminated aromatic amide compound with the diol compound is not particularly limited provided that the reactants are soluble therein. As examples of the solvent, there can be mentioned N-methyl-2-pyrrolidone, N-ethyl-2-pyrrolidone, N-methylacetamide, N,N'-dimethylacetamide, N,N'-diethylacetamide, N,N'-dimethylformamide, N,N'-dimethylpropionic acid amide, N,N'-dimethylmethoxyacetamide, N,N'-diethylpropionic acid amide, dimethylsulfoxide, dimethylsulfone, sulfolane, γ-butyrolactone, tetramethylurea, hexamethylphosphoryltriamide and N-methylcaprolactam. Of these, N-methyl-2-pyrrolidone (NMP) is most preferable because an activated acyl lactam-terminated aromatic amide compound is soluble in NMP to a largest extent and thus the amount of NMP may be smallest.

The amount of the solvent used is usually 1 to 50% by weight based on the weight of the total amount of the activated acyl lactam-terminated aromatic amide compound and the diol compound. In view of the solubility and reactivity (which varies depending upon the concentration of the reactants) for obtaining a high-molecular-weight polymer, the amount of the solvent is preferably 10 to 40% by weight.

The invention will now be specifically described by the following examples that illustrate embodiments of the invention and by no means limit the scope of the invention.

The methods for analysis of the ester-amide block copolymers prepared in the examples are as follows.

(1) Weight average molecular weight

The weight average molecular weight was determined by gel permeation chromatography (GPC) using an apparatus "CP-800" (supplied by Tosoh Corp.) having two columns ("GMHXL" supplied by Tosoh Corp.) packed with polystyrene gel ("G2000H8") and connected to each other. N-methyl-2-pyrrolidone having incorporated therein 20 mM of lithium chloride was used as the eluting solution. The rate of flow was 1.0 ml/min. The column temperature was 40° C. The weight average molecular weight was expressed in terms of polystyrene.

(2) $^1$H-NMR spectrum and $^{13}$C-NMR spectrum

Using JNM-GSX270 type apparatus supplied by JEOL Ltd., the measurement was conducted in deuterated dimethylsulfoxide at 45° C. at integrations of 400 times and 18,000 times.

(3) Thermal aging resistance

The weight average molecular weight of a polymer specimen was measured by GPC after it was aged in Geer oven wherein air was circulated at 120° C., for a predetermined period of time.

(4) Glass transition temperature (Tg) and melting point (Tm)

Using a differential scanning calorimeter ("DSC 200" supplied by Seiko Instruments Inc.), the measurement was conducted at a temperature elevation rate of 10° C./min in a temperature range of −100° to 300° C.

(5) Breaking strength

Breaking strength was measured on a sheet specimen having a thickness of 1 mm by using an autograph "DCS-100" supplied by Shimadsu Corp.

Synthesis Example 1

Synthesis of p-sulfinylaminobenzoyl chloride

A one liter-volume three-necked round flask equipped with a reflux condenser was charged with 200 g (1.458 mol) of p-aminobenzoic acid and a large excess, i.e., 500 ml, of thionyl chloride. The content was refluxed for 6 hours, and the excess of thionyl chloride was distilled off under a reduced pressure to give a yellow solid.

The yellow solid was distilled at a reduced pressure of 1 to 2 mmHg. Fractions having a boiling point of 110° to 115° C. was collected and stored under a nitrogen atmosphere. Thus p-sulfinylaminobenzoyl chloride having a melting point of 31° C. was obtained in a yield of 95%.

Synthesis Example 2

Synthesis of N-(p-aminobenzoyl)caprolactam

A three liter-volume three-necked flask was charged with 144 g (1.27 mol) of caprolactam, 2 liters of toluene and 1 liter of pyridine, and the content was stirred at 0° C. under a nitrogen gas atmosphere. Then 256.5 g (1.27 mol) of p-sulfinylaminobenzoyl chloride, synthesized in Synthesis Example 1, was added into the flask, and the mixture was gently stirred until the temperature reached room temperature. Thereafter the content was stirred for 14 hours to conduct a reaction. Pyridine hydrochloride, thus precipitated, was filtered and the filtrate was washed twice with aqueous 5% sodium hydrogencarbonate. The solvent was distilled off under a reduced pressure from the organic phase to afford a white residue. The white residue was twice recrystallized from ethyl acetate to give N-(p-aminobenzoyl)caprolactam having a melting point of 156°–158° C. in a yield of 68%.

Synthesis Example 3

Synthesis of activated acyl lactam-terminated aromatic amide

A 1,000 ml-volume four-necked flask equipped with a nitrogen gas introducer and a thermometer was charged with 200 g (0.862 mol) of N-(p-aminobenzoyl)caprolactam, synthesized in Synthesis Example 2, 700 ml of N-methyl-2-pyrrolidone, and 68.18 g (0.862 mol) of pyridine, and the content was stirred to give a uniform solution. A 500 ml-volume dropping funnel equipped with a nitrogen introducer was charged with 300 ml of N-methyl-2-pyrrolidone and 87.50 g (0.431 mol) of terephthaloyl dichloride and the content was stirred to give a uniform solution. The content in the dropping funnel was dropwise added into the flask over a period of 10 minutes. Thereafter, the content was stirred for 14 hours to conduct a reaction whereby a crystal was precipitated. The precipitated crystal was filtered under suction, washed with 500 ml of N-methyl-2-pyrrolidone and then 1,000 ml of acetone, and dried at 100° C. under a reduced pressure for 14 hours to afford an activated benzoyl lactam-terminated aromatic amide.

Figure 2:
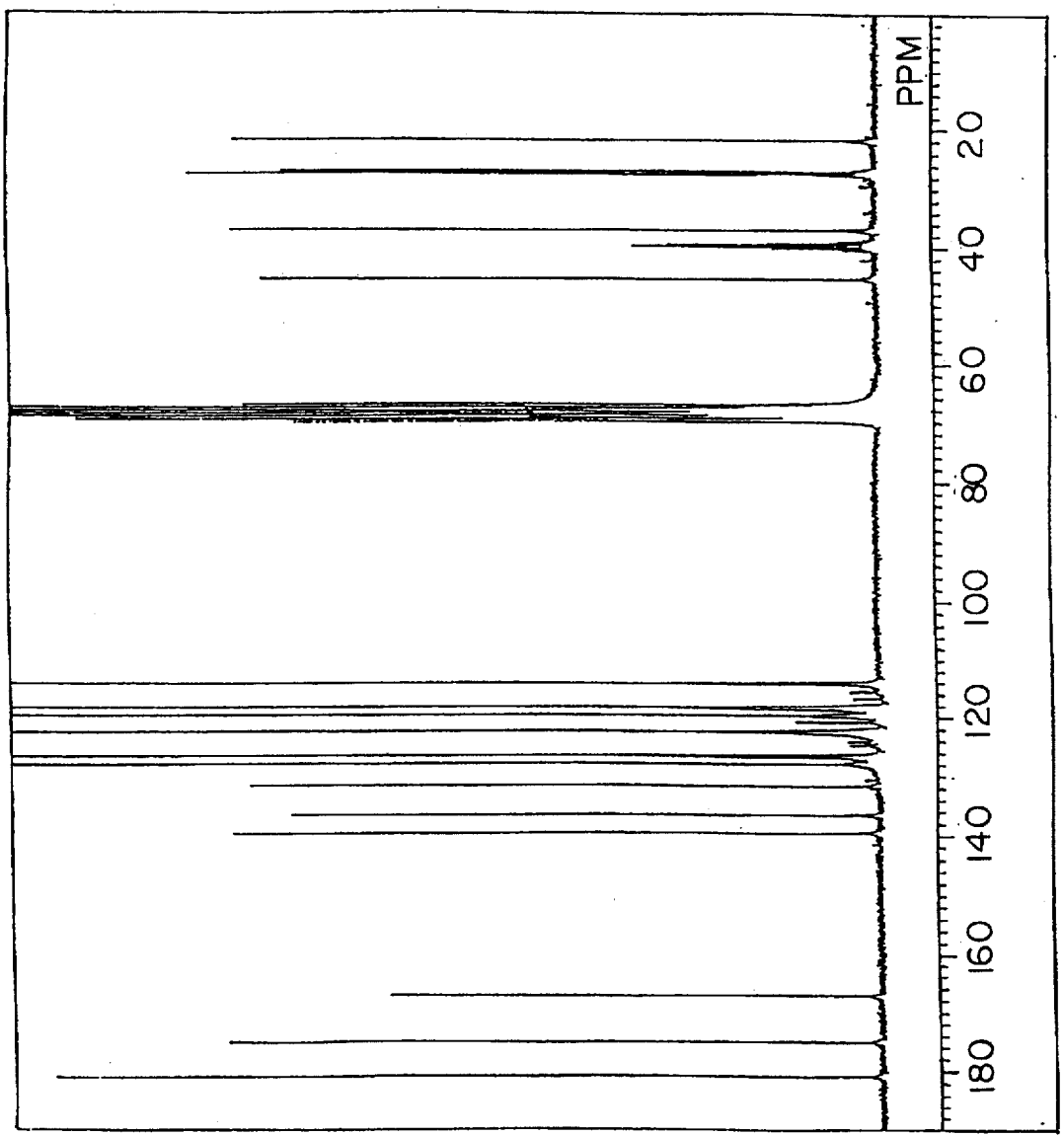
FIG. 2 is the $^{13}$C-NMR spectrum of the activated acyl lactam-terminated aromatic amide prepared in Synthesis Example 3.

$^1$H-NMR spectrum and $^{13}$C-NMR spectrum of the activated benzoyl lactam-terminated aromatic amide are shown in FIG. 1 and FIG. 2, respectively.

Comparative Example 1

Production of ester-amide block copolymer by ester exchange reaction

A 500 ml-volume separable flask equipped with a nitrogen introducer, a temperature sensor, a stirrer and a distillation apparatus was charged with 100.0 g (0.05 mol) of poly(caprolactone) glycol (PCL) having a molecular weight of 2,000 ("PLACCEL 210" supplied by Daicel Chem. Ind.), 23.00 g (0.05 mol) of N,N'-bis(4-ethoxycarbonylphenyl) phenylene-1,4-dicarboxamide, and 0.13 g (0.1% by an antioxidant ("Irganox 1010" supplied by Ciba-geigy), and the content was dried at 100° C. under a reduced pressure. Then 61.5 g of N-methyl-2-pyrrolidone (NMP) and 0.14 g of tetrabutoxytitanate were added into the flask, and the mixture was heated to 210° C. at which a reaction was conducted for 1 hour. The degree of pressure reduction was gradually increased and the temperature was elevated to 240° C. over a period of 1 hour to remove substantially completely the solvent. Simultaneously with removal of the solvent, ethanol, produced by the reaction, was distilled off. Further, the reaction was continued at 240° C. under a reduced pressure of 1 mmHg for 1 hour to give a polymer exhibiting a high viscosity. The polymer was recovered in a nitrogen atmosphere. The yield was 111.2 g (97%).

The polymer had a weight average molecular weight of 12,000 as measured by GPC and expressed in terms of polystyrene, and exhibited a breaking strength of 53 kg/cm$^2$.

Comparative Example 2

A 500 ml-volume separable flask equipped with a nitrogen introducer, a temperature sensor, a stirrer and a distillation apparatus was charged with 51.55 g (0.05 mol) of polytetramethylene glycol (PTMG), 23.00 g (0.05 mol) of N,N'-bis(4-ethoxycarbonylphenyl)phenylene-1,4-dicarboxamide, and 0.07 g (0.1% by weight) of an antioxidant ("Irganox 1010" supplied by Ciba-geigy), and the content was dried at 100° C. under a reduced pressure. Then 37.3 g of NMP and 0.09 g of tetrabutoxytitanate were added into the flask, and the mixture was heated to 210° C. at which a reaction was conducted for 1 hour. The degree of pressure reduction was gradually increased and the temperature was elevated to 240° C. over a period of 1 hour to remove substantially completely the solvent. Simultaneously with the removal of the solvent, ethanol, produced by the reaction, was distilled off. Further, the reaction was continued at 240° C. under a reduced pressure of 1 mmHg for 1 hour to give an elastomeric polymer exhibiting a high viscosity. The elastomeric polymer was recovered in a nitrogen atmosphere. The yield was 62.9 g (96%).

Figure 3:
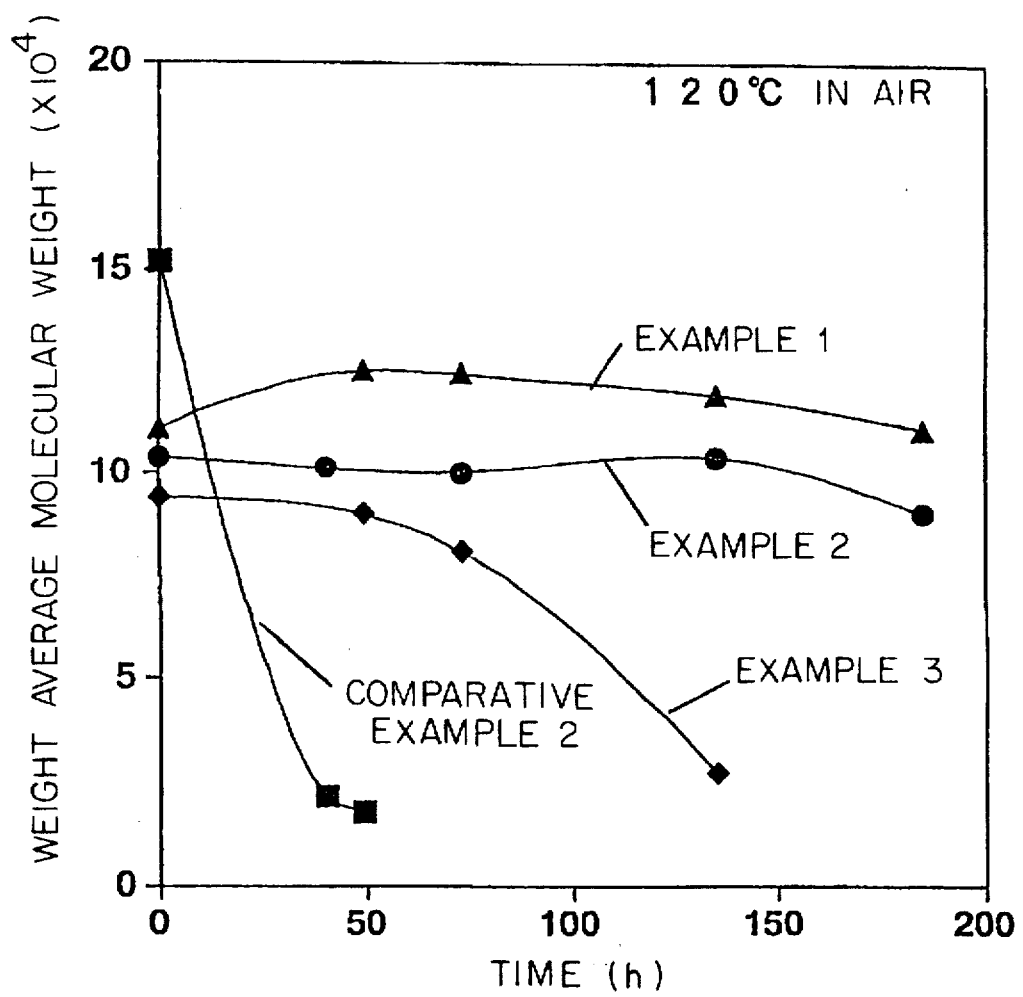
FIG. 3 is the a diagram showing thermal aging resistance of elastomers prepared in Examples 1 to 3 and Comparative Example 2.

The elastomeric polymer had a weight average molecular weight of 100,000 as measured by GPC and expressed in terms of polystyrene, and exhibited a breaking strength of 250 kg/cm². The thermal aging resistance is shown in FIG. 3.

EXAMPLE 1

A 500 ml-volume separable flask equipped with a nitrogen introducer, a temperature sensor, a stirrer and a distillation apparatus was charged with 100.0 g (0.05 mol) of poly(caprolactone) glycol (PCL) having a molecular weight of 2,000 ("PLACCEL 210" supplied by Daicel Chem. Ind.), 29.73 g (0.05 mol) of an activated acyl lactam-terminated aromatic amide, synthesized in Synthesis Example 3, and 0.13 g (0.1% by weight) of an antioxidant ("Irganox 1010" supplied by Ciba-geigy), and the content was dried at 100° C. under a reduced pressure.

Then 64.9 g of NMP was added into the flask, and the mixture was heated to 210° C. at which a reaction was conducted for 1 hour. The degree of pressure was gradually increased and the temperature was elevated to 240° C. over a period of 1 hour to remove substantially completely the solvent. Simultaneously with removal of the solvent, ε-caprolactam, produced by the reaction, was distilled off. Further, the reaction was continued at 240° C. under a reduced pressure of 1 mmHg for 1 hour to give an elastomeric polymer having a high viscosity. The polymer was recovered in a nitrogen atmosphere in a yield of 95.00 g (98%).

Figure 4:
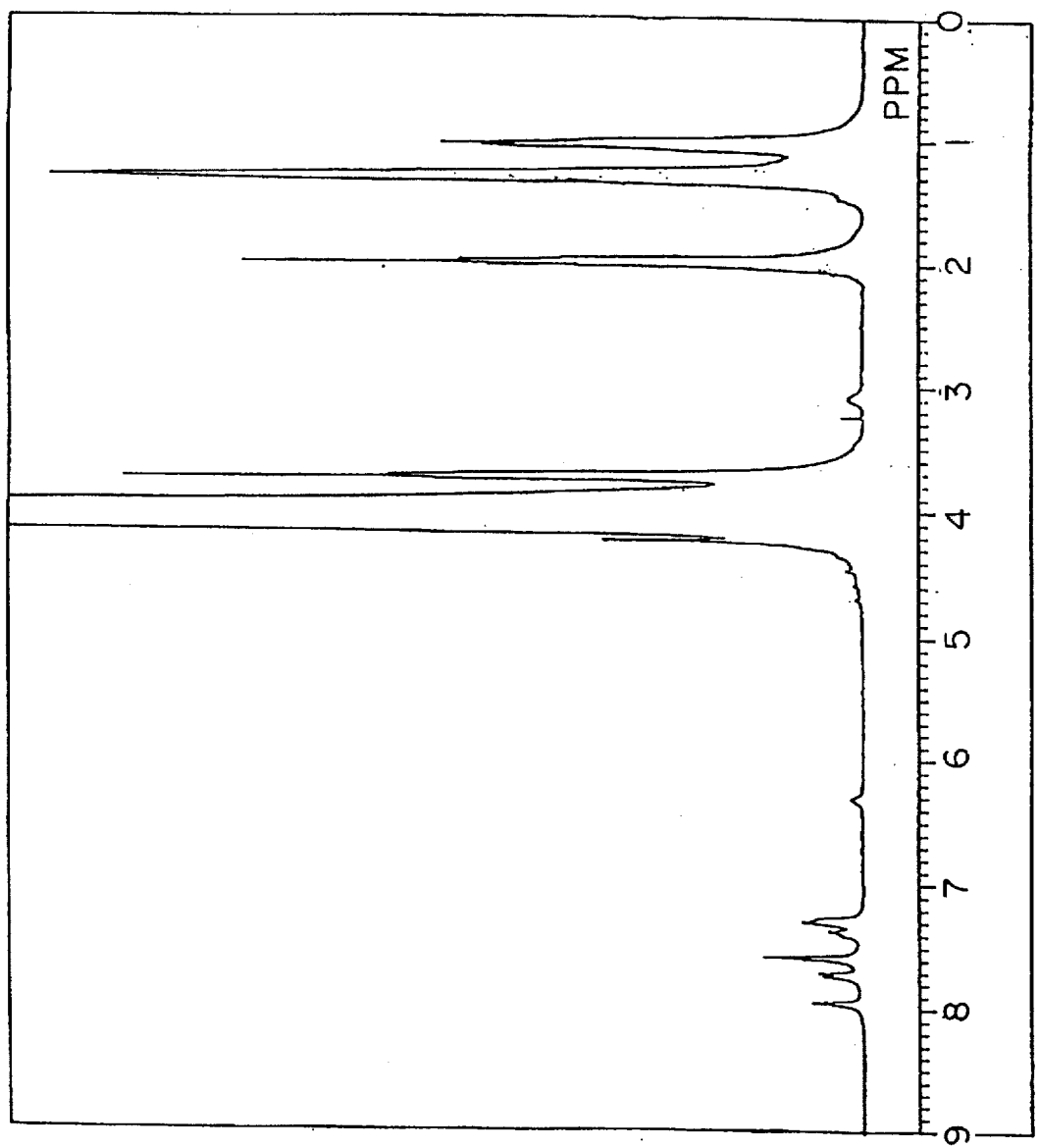
FIG. 4 is the H-NMR spectrum of an esteramide block copolymer prepared in Example 1.
Figure 5:
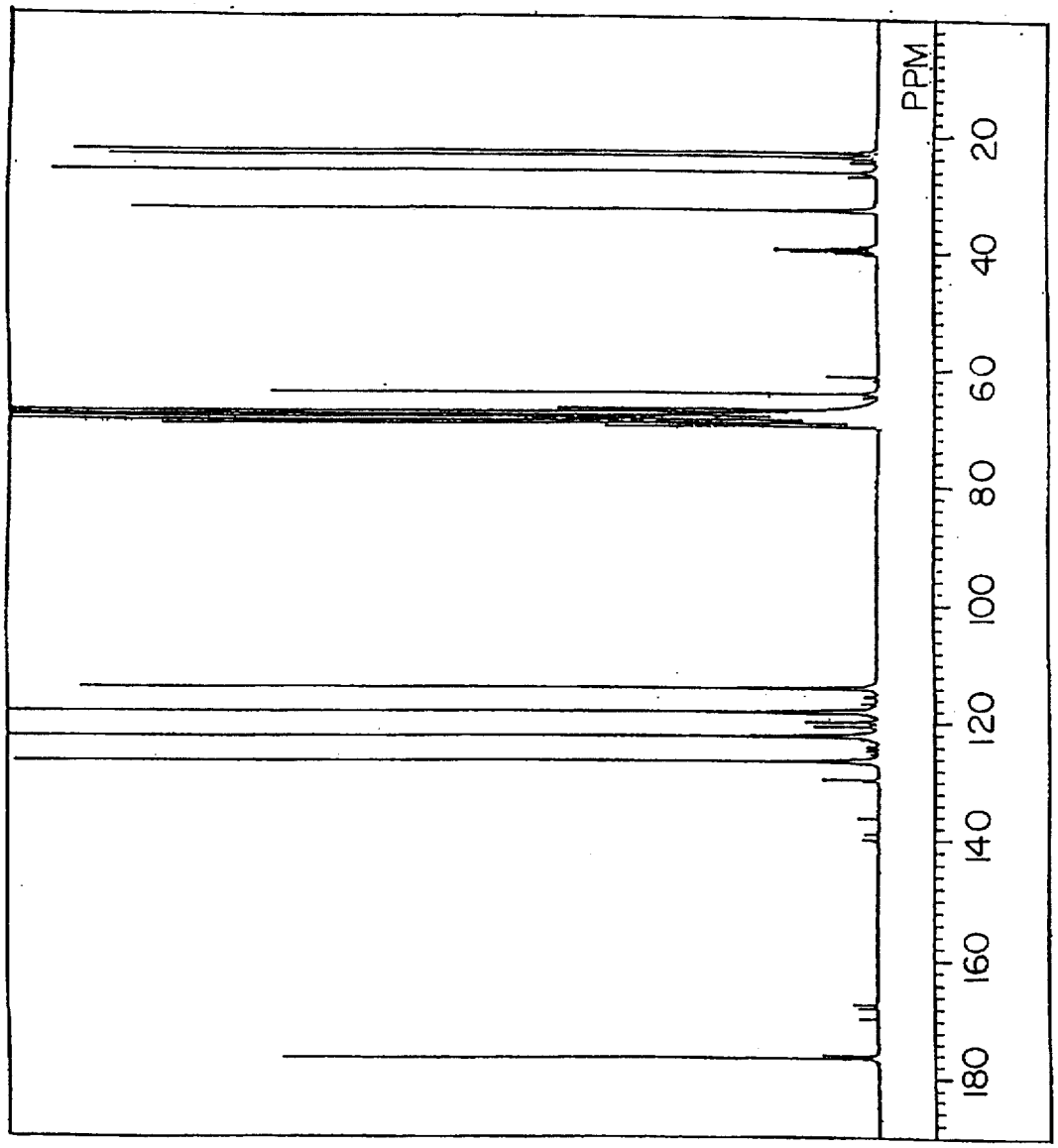
FIG. 5 is $^{13}$C-NMR spectrum of the esteramide block copolymer prepared in Example 1.

The elastomeric polymer had a weight average molecular weight of 111,000 as measured by GPC and expressed in terms of polystyrene, and exhibited a breaking strength of 473 kg/cm², a melting point of 207° C. and a glass transition point of −60° C. ¹H-NMR spectrum and ¹³C-NMR of the elastomeric polymer are shown in FIG. 4 and FIG. 5, respectively. The thermal aging resistance is shown in FIG. 3.

As seen from the above results, an ester-amide block copolymer synthesized by using PCL as the soft segment (Example 1) exhibits an improved thermal aging resistance as compared with an ester-amide block copolymer synthesized by using PTMG as the soft segment (Comparative Example 2).

EXAMPLE 2 to 4

By the same procedures as described in Example 1, elastomeric polymers were produced except that poly (butylene-1,4 adipate) glycol (PBA) (Example 2), polytetrahydrofurancarbonate diol (PCD) (Example 3) and poly (dimethylsiloxane) glycol (PDMS) (Example 4) were used instead of PCL as the diol compound. All other conditions remained substantially the same.

The diol compounds used, the molar ratio of the diol/ activated acyl lactam-terminated aromatic amide, and the properties of the elastomeric polymers prepared are shown in Table 1. The thermal aging resistance is shown in FIG. 3.

TABLE 1

| | Polycondensation conditions | | Properties of polymer | | |
|---|---|---|---|---|---|
| | Diol compound (Mol. wt.) | Mol. ratio of Diol/term. actd. aromatic amide | Wt. average mol. wt. (Mw) | Breaking strength (kg/cm²) | Melting point (°C.) |
| Example 2 | PBA (2,066) | 1:1 | 104,000 | 336 | 215 |
| Example 3 | PCD (2,043) | 1:1 | 102,000 | 245 | 201 |
| Example 4 | PDMS (2,097) | 1:1 | 115,000 | 150 | 210 |

What is claimed is:

1. An ester-amide block copolymer represented by the following formula (1):

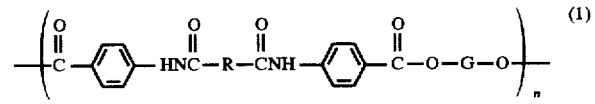

wherein R is a divalent aromatic hydrocarbon group having 6 to 20 carbon atoms and G is an aliphatic polyester residue, an aliphatic polycarbonate residue, an aliphatic polyethercarbonate residue or a polyorganosiloxane residue, and n is a number corresponding to the weight average molecular weight of the copolymer which is in the range of 30,000 to 1,000,000 as measured by gel permeation chromatography (GPC) and expressed in terms of polystyrene.

2. An ester-amide block copolymer according to claim 1 wherein R in formula (1) is selected from the group consisting of a phenylene group, a tolylene group, a xylylene group, a naphthylene group and a biphenylene group.

3. An ester-amide block copolymer according to claim 1 wherein R in formula (1) is a phenylene group.

4. An ester-amide block copolymer according to claim 1 wherein G in formula (1) is selected from the group consisting of poly(caprolactone), poly(methylvalerolactone), poly(ethylene adipate), poly(butylene-1,4 adipate), poly (methylpentanediol adipate), poly(butylene-1,4 hexanediol 1,6 adipate), poly(hexanediol-1,6 carbonate), polytetrahydrofurancarbonate, poly(dimethylsiloxane) and poly(methylphenylsiloxane).

5. An ester-amide block copolymer according to claim 1 which has a weight average molecular weight of 80,000 to 500,000.

6. A process for producing an ester-amide block copolymer represented by the following formula (1):

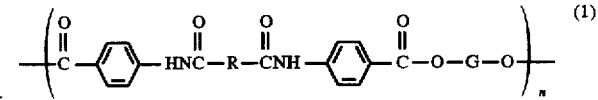

wherein R is a divalent aromatic hydrocarbon group having 6 to 20 carbon atoms and G is an aliphatic polyester residue, an aliphatic polycarbonate residue, an aliphatic polyether-carbonate residue or a polyorganosiloxane residue, and n is a number corresponding to the weight average molecular weight of the copolymer which is in the range of 30,000 to 1,000,000 as measured by gel permeation chromatography (GPC) and expressed in terms of polystyrene, which comprises polycondensing an activated acyl lactam-terminated aromatic amide compound represented by the following formula (2) with a diol compound represented by the following formula (3) by a bulk polymerization procedure in a molten state, the ratio of the activated acyl lactam-terminated aromatic amide compound to the diol compound being in the range of 0.8/1.0 to 1.0/0.8 by mole:

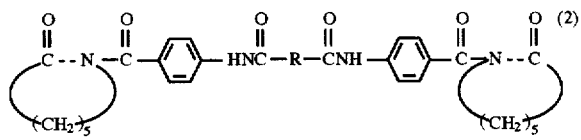

wherein R in formula (2) and G in formula (3) are the same as defined with regard to formula (1).

7. The process for producing an ester-amide block copolymer according to claim 6, wherein the polycondensation of the activated acyl lactam-terminated aromatic amide compound with the diol compound is conducted in the absence of a catalyst.

8. The process for producing an ester-amide block copolymer according to claim 6, wherein the activated acyl lactam-terminated aromatic amide compound is polycondensed with the diol compound at normal pressures to prepare a prepolymer having a molecular weight of not larger than 10,000; followed by continuation of the polycondensation at a reduced pressure.

9. The process for producing an ester-amide block copolymer according to claim 6, wherein the activated acyl lactam-terminated aromatic amide compound is polycondensed with the diol compound at normal pressures in the presence of a solvent having a boiling point of 140° to 290° C. to prepare a prepolymer having a molecular weight of not larger than 10,000; the solvent is removed from the polymerization mixture; followed by continuation of the polycondensation by a bulk polymerization procedure in a molten state at a reduced pressure.

10. The process for producing an ester-amide block copolymer according to claim 9, wherein the polycondensation for the preparation of the prepolymer is carried out at a temperature of 140° to 220° C. and the following polycondensation for the preparation of the high-molecular-weight block copolymer is carried out at a temperature of 210° to 270° C. and a reduced pressure of 0.1 to 2 mmHg.

* * * * *